United States Patent [19]

Wu

[11] Patent Number: 4,656,752
[45] Date of Patent: Apr. 14, 1987

[54] PRECISE-READING ANGULAR LEVEL

[76] Inventor: Chyi-Yiing Wu, P.O. Box 10160, Taipei, Taiwan

[21] Appl. No.: 869,602

[22] Filed: Jun. 2, 1986

[51] Int. Cl.⁴ ............................................. G01C 9/10
[52] U.S. Cl. .................................................... 33/399
[58] Field of Search ................. 33/391, 396, 397, 398, 33/399, 400, 402

[56] References Cited

U.S. PATENT DOCUMENTS

| | | | |
|---|---|---|---|
| 841,598 | 1/1907 | Stricker | 33/399 |
| 2,298,072 | 10/1942 | Somerville et al. | 33/400 |
| 3,344,531 | 10/1967 | Emerson | 33/400 X |

FOREIGN PATENT DOCUMENTS 2355487  7/1974  Fed. Rep. of Germany ........ 33/391

Primary Examiner—Harry N. Haroian

[57] ABSTRACT

A precise-reading angular level includes a casing, a rotational protractor rotatably mounted in the casing, a plumbing swing wheel pivotedly mounted in the protractor, and a vernier formed on the central top position of the casing above the protractor, wherein the protractor is made to have an outer angle scale matching with the vernier scale and an inner angle scale operatively coinciding with a pointer printed on the swing wheel to prevent strabismal reading error, and an aligning pointer is formed on the protractor to projectively superimpose the pointer on the wheel for convenient reading of the measured angle even after removing the level from the measuring position.

1 Claim, 8 Drawing Figures

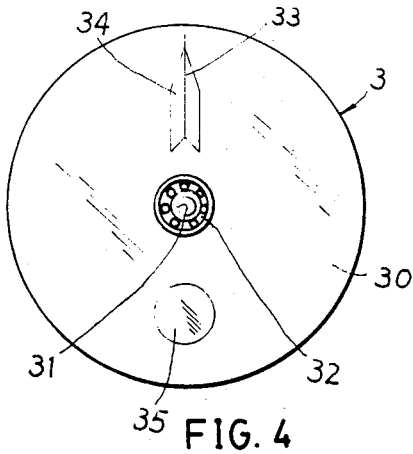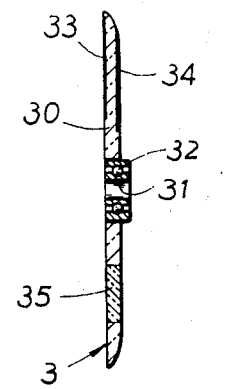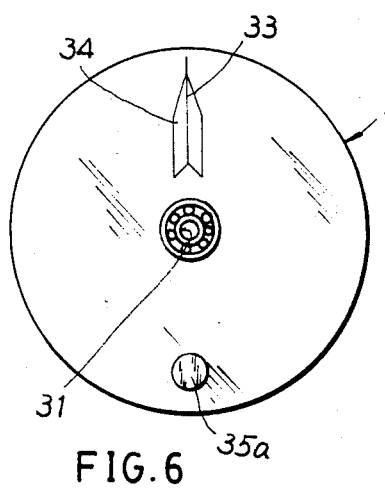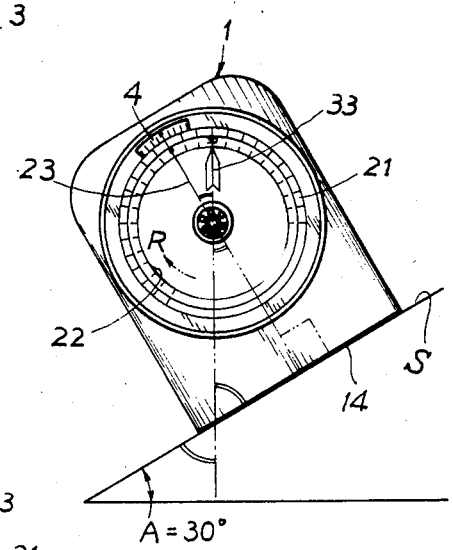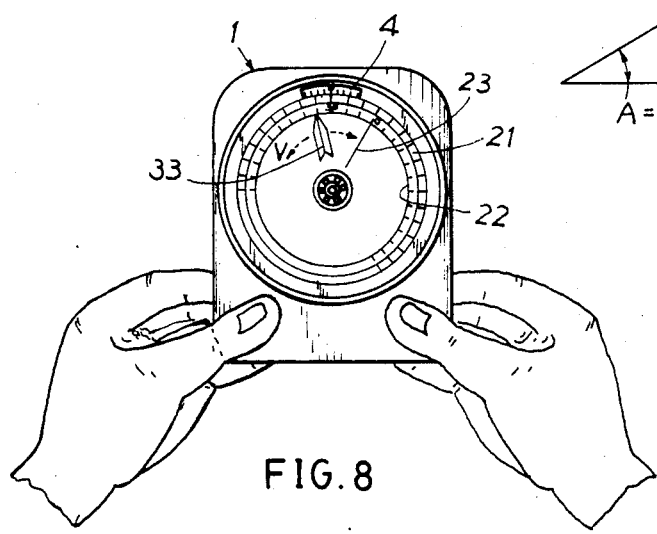

PRECISE-READING ANGULAR LEVEL

BACKGROUND OF THE INVENTION

Pernum disclosed a goniometer instrument having vernier scale in this German Pat. No. 2,359,487, which includes a plumb plate rotatably mounted in a meter casing having a weight, preferably made of lead and having a thickness fixed in a wall of the plumb plate and has the following defects:

1. The vernier scale is separated from the main angle scale with a distance to thereby easily cause strabismal reading error.
2. The weight has an appreciated thickness and is preferably made of metallic lead so that it may increase the friction with its environment during its oscillation and may affect the optical transparency or esthetical meaning because of the clumsy thick opaque weight.
3. The angle must be read in situ to cause reading inconvenience and once the meter is uncarefully moved, the indicating angle will be fluctuated to influence the reading precision.

The present inventor has found the defects of conventional goniometer and invented the present precise-reading angular level.

SUMMARY OF THE INVENTION

The object of the present invention is to provide an angular level including a casing, a rotational protractor rotatably mounted in the casing, a plumbing swing wheel pivotedly formed on the protractor panel and a vernier provided on the top position of the casing, wherein the protractor is made to have an outer angle scale and an inner angle scale to respectively correspond the vernier scale and the pointer marked on the swing wheel for precise reading and the swing wheel is incorporated with a transparent plumbing disk to enhance the light transmission for precise reading and esthetical meaning.

BRIEF DESCRIPTION OF THE DRAWINGS

FIG. 4 shows the plumbing swing wheel of the present invention.

FIG. 5 is a sectional drawing of the swing wheel of the present invention.

FIG. 6 shows another preferred embodiment of the swing wheel.

FIG. 7 shows an application when using the present invention for measuring the inclination of an object.

FIG. 8 shows an angle-reading step following that shown in FIG. 7.

DETAILED DESCRIPTION

Figure 1:
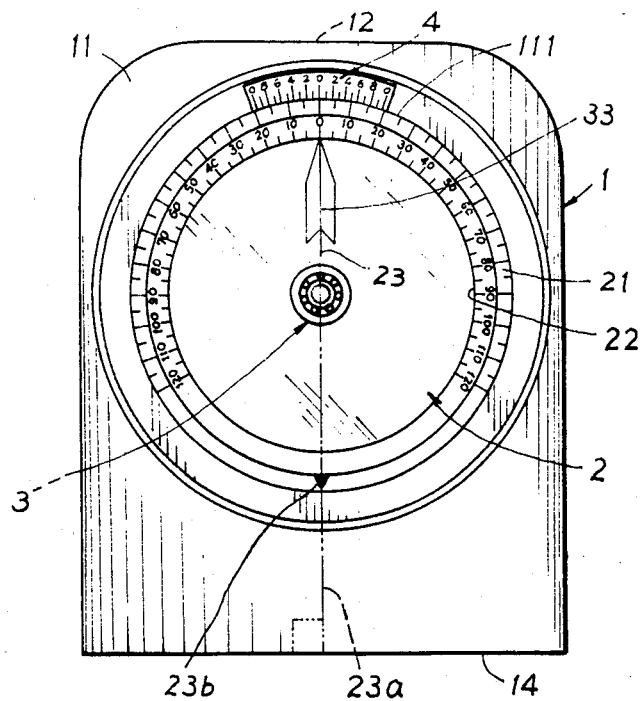
FIG. 1 is a front view of the present invention.
Figure 2:
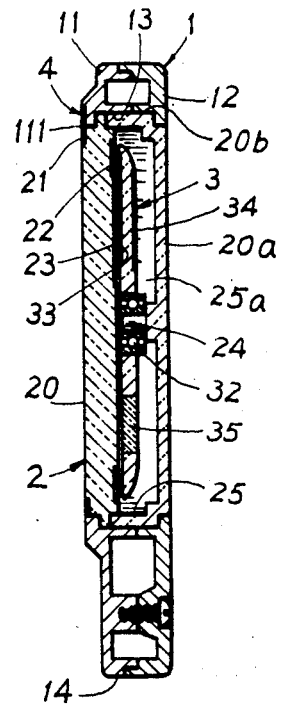
FIG. 2 is a side sectional drawing of the present invention.

As shown in the figures, the present invention comprises: a casing 1, a rotational protractor 2 rotatably mounted in the casing 1, a plumbing swing wheel 3 pivotedly mounted in the protractor 2 and a vernier 4 formed on the top position of the casing 1.

The casing 1 includes a front plate 11 and a rear plate 12 combined together to form an annular groove 13 inside the casing 1 and form a flat bottom surface 14. The front plate 11 is formed with a round hole 111 to reveal an angle scale of the rotational protractor 2 as protruding through hole 111. On the central top position of a rim along the round hole 111, there is provided with a vernier 4 having its central zero graduation projectively aligned with the center of round hole 111 and the center of bottom surface 14 to show a real zero degree of the level.

The rotational protractor 2, made of transparent plastic materials, includes: a front panel 20, a rear panel 20a combined with the front panel 20 to form a shallow cylindrical hollow portion 25 inside the two panels and form an annular flange 20b rotatably engaged with the annular groove 13 of casing 1, an outer angle scale 21 printed on the periphery of the outer surface of the front panel 20 and having angle graduations respectively distributed both righward and leftward from a central zero graduation coinciding with the zero graduation of the vernier 4 on a same plane to show a real zero degree of the level, an inner angle scale 22 having graduations projectively corresponding to that of the outer angle scale 21 and being printed on the periphery of the inside wall of the front panel 20 with a diameter slightly smaller than that of the outer scale 21, an aligning pointer mark 23 printed on the radius of the protractor 2 and aligned with the zero graduation of the protractor and with a normal line 23a perpendicular to the center of bottom 14, a pivot 24 centrally extending from the rear panel 20a to pivotedly mount the plumbing swing wheel 3, and a transparent dampening oil 25a filled in the hollow portion to dampen the vibration of the wheel 3.

The plumbing swing wheel 3 as shown in FIGS. 4 and 5 is formed with a pivot hole 31 on the center of a bearing 32 centrally embedded in a transparent wheel disk 30 made of acrylic plastic material. A pointer mark 33 is printed on the outer surface of the upper half portion of the wheel 3 and projectively superimposed on the center of an arrow background mark 34 printed on the bottom surface of the wheel 3. A transparent plumb 35, preferably made of glass material and having a density greater than that of the wheel disk 30, is embedded on the lower half portion of the wheel disk 30. The pointer mark 33 coincides with the zero graduation of the vernier 4 when the wheel 3 is gravitationally pendant on the pivot 24 of the protractor 2. The plumb 35 is made transparent to increase the light transmission so as to benefit the rotative matching of the pointer mark 23 with the pointer mark 33. If the plumb 35 is made of metal such as copper 35a as shown in FIG. 6, its size can be reduced and its position can be approached to the perimeter as near as possible. The thickness of the plumb 35 is the same as that of the wheel disk 30.

When using the present invention to measure the inclination of an object S as shown in FIG. 7, the bottom surface 14 is laying down on the object and the pointer 33 will point at the inclined angle A (for example 30°) and can be read in situ on the inner scale 22. However, in order to read the measured angle conveniently, the protractor 2 is rotated to allow the aligning pointer mark 23 to coincide with the pointer mark 33 as the rotating direction R shown in FIG. 7. The level is then optionally held as shown in FIG. 8 regardless the vibration V of the pointer mark 33 of swing wheel 3 and the measured angle (degrees) aligned with the zero graduation of vernier 4 (30°) can be read directly on the outer scale 21.

The present invention has the following advantages in comparison with the prior goniometer:

1. There is provided with both angle scales 21, 22 to prevent the strabismal reading error as viewed through the thickness of the front panel 20 of protractor 2. The pointer mark 33 and the arrow background mark 34 should be read projectively matched with each other to prevent reading error, too.

2. The plumb 35 is made of transparent material and has the thickness of the wheel disk 30 so that the wheel 3 can be quickly rotated to point the measured angle with minimum friction caused by the dampening oil 25a which also optically reflects the pointer 33 for easier reading.

3. An aligning pointer 23 on protractor can be rotated to coincide with the pointer 33 of wheel 3 so that the level can be optionally removed to read the measured angle more conveniently, without careful adjusting the observer's pose to read the measured angle in situ when laying the level on a sloping object as usual way.

Figure 3:
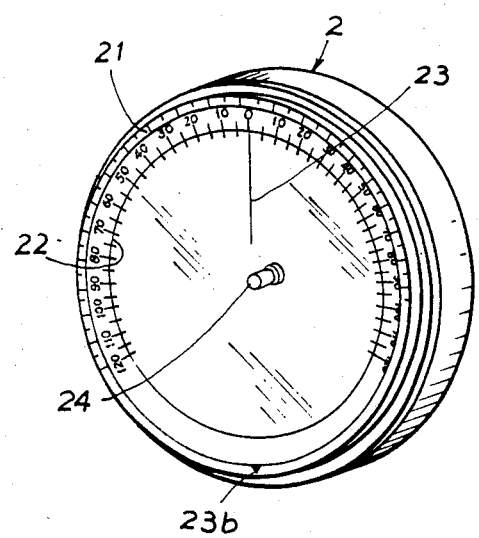
FIG. 3 is an illustration showing the rotational protractor of the present invention.

In order to enhance the visual coincidence of graduations 22 with the pointer 33, each graduation may be radially protruded towards the center of protractor 2 at a short length as shown in FIG. 3.

On the opposite end of the zero graduation of the protractor 2, there is formed with an arrow mark 23b, whereby when turning the level upside down, a roof beam, for instance, can be checked for its horizon.

I claim:

1. A precise-reading angular level comprising:

a casing consisting of a front plate and a rear plate combined to form an annular groove therein and having a round hole formed on the front plate;

a rotational protractor made of transparent material formed by combining a front panel protruding through said round hole of said casing and a rear panel to form an annular flange rotatably engaged with said annular groove of said casing and to form a shallow cylindrical hollow portion therein for filling a transparent dampening oil inside said hollow portion, a pivot extending from said rear panel within said hollow portion;

a plumbing swing wheel made of transparent plastic disk and pivotedly mounted on said pivot of said protractor; and a vernier formed on the central top position of a rim along said round hole of said casing, having a zero graduation showing the real zero degree of said level;

the improvement which comprises:

(A) said rotational protractor formed with an outer angle scale having angle graduations respectively printed both rightward and leftward from a central zero graduation coinciding with the zero graduation of said venier on a same plane, and printed on the periphery of the outer surface of said front panel of said protractor;

an inner angle scale printed on the periphery of the inside wall of said front panel with a diameter slightly smaller than that of said outer angle scale; and an aligning pointer mark printed on the radius of the protractor and projectively aligning zero graduation of said protractor and aligned with a normal line perpendicular to the center of the bottom of said casing;

(B) said plumbing swing wheel printed with a pointer mark on the outer surface of the upper half portion of said wheel to projectively superimpose the central line of an arrow background mark printed on the bottom surface of said wheel;

and embedded with a transparent plumb made of glass material heavier than said plastic disk of said wheel on the lower half portion of said wheel, said pointer mark of said wheel coinciding with said zero graduation of said vernier as said wheel being gravitationally pendant on pivot of said protractor, whereby upon the laying of the bottom of said casing on a measured object, said pointer mark of said wheel will point at the inner scale of said protractor for reading the measured angle in situ, and by rotating said protractor to allow said aligning pointer mark of said protractor projectively coinciding with said pointer mark of said wheel, the degrees may be quickly read out as the measured degrees on said outer scale coinciding with the zero graduation of said vernier.

* * * * *